US007935174B2

(12) United States Patent  
Roth et al.

(10) Patent No.: US 7,935,174 B2
(45) Date of Patent: May 3, 2011

(54) TREATMENT OF STEEL PLANT SLUDGES IN A MULTIPLE-STAGE FURNACE

(75) Inventors: Jean-Luc Roth, Thionville (FR); Emile Lonardi, Bascharage (LU)

(73) Assignee: Paul Wurth S.A., D'alsace (LU)

( * ) Notice: Subject to any disclaimer, the term of this patent is extended or adjusted under 35 U.S.C. 154(b) by 175 days.

(21) Appl. No.: 11/664,505

(22) PCT Filed: Oct. 4, 2005

(86) PCT No.: PCT/EP2005/054985
§ 371 (c)(1),
(2), (4) Date: Apr. 3, 2007

(87) PCT Pub. No.: WO2006/037777
PCT Pub. Date: Apr. 13, 2006

(65) Prior Publication Data
US 2008/0066579 A1   Mar. 20, 2008

(30) Foreign Application Priority Data

Oct. 5, 2004  (EP) ..................................... 04104885
Oct. 11, 2004 (EP) ..................................... 04104968

(51) Int. Cl.
*C22B 1/00*    (2006.01)
(52) U.S. Cl. ........................................................ 75/760
(58) Field of Classification Search ................... 75/56.3, 75/629, 30, 436, 450, 760; 423/38; 65/141; 373/94
See application file for complete search history.

(56) References Cited

U.S. PATENT DOCUMENTS

| 3,989,513 | A | * | 11/1976 | Dobos et al. | 75/10.67 |
| 4,239,530 | A | * | 12/1980 | Goksel | 75/478 |
| 4,248,164 | A | | 2/1981 | Isheim | |
| 4,940,487 | A | | 7/1990 | Lugscheider et al. | |
| 5,757,827 | A | * | 5/1998 | Makio et al. | 372/22 |
| 5,912,916 | A | * | 6/1999 | Hendrix | 373/94 |
| 6,355,088 | B1 | * | 3/2002 | Greenwalt | 75/436 |
| 6,379,426 | B1 | * | 4/2002 | Shonewille et al. | 75/629 |
| 6,500,229 | B1 | * | 12/2002 | Roux et al. | 75/430 |
| 6,770,249 | B1 | * | 8/2004 | Hoboy et al. | 423/38 |
| 7,033,417 | B1 | * | 4/2006 | Patzelt et al. | 75/450 |

FOREIGN PATENT DOCUMENTS

| EP | 0285 458 A2 | 10/1988 |
| WO | 00/66796 A1 | 11/2000 |
| WO | 02/086406 A1 | 10/2002 |

OTHER PUBLICATIONS

Carnigila, S. C., Barna, G. L., Handbook of Industrial Refractories Technology—Principles, Types, Properties and Applications, Chapter 3, p. 82, 1992, William Andrew Publishing/Noyes. ISBN: 978-0-8155-1304-9.*
Carnigila, S.C., Barna, G.L., Handbook of Industrial Refractories Technology-Principles, Types, Properties and Applications, Chapter 3, p. 82, 1992, William Andrew Publishing/Noyes.*
*XP-002320990*: Database WPI; KR 2003 037 748 A (POSCO); Derwent Publications Ltd; May 16, 2003.
*XP-002320991*: Database WPI; SU 630 301 A (ROSTOVSKII VI); Derwent Publications Ltd; Sep. 15, 1978.
*XP-002320992*: Database WPI; JP 53 040614 A (NISSHIN Steel Co Ltd); Derwent Publications Ltd; Apr. 13, 1978.
*XP-002363196*: Database WPI; JP 52 152811 A (NISSHIN Steel Co Ltd); Derwent Publications Ltd; Dec. 19, 1997.
*XP-002363197*: Database WPI; JP 53 030402 A (NISSHIN Steel Co Ltd); Derwent Publications Ltd; Mar. 22, 1978.

* cited by examiner

*Primary Examiner* — Jennifer K. Michener
*Assistant Examiner* — Eli S Mekhlin
(74) *Attorney, Agent, or Firm* — The Nath Law Group; Jerald L. Meyer; Stanley N. Protigal

(57) ABSTRACT

The invention concerns a method for treating iron-and-steel plant sludge comprising adjusting the available CaO content of the sludge so as to obtain an available CaO content of 3% to 8% based on the sludge weight, adding a carbon-containing fuel, introducing the sludge onto one of the upper stages of a multistage furnace, heating the multistage furnace, gradually transferring the sludge onto the lower stages, and adjusting the temperature of the exhaust gases of the multistage furnace to at least 500.degree. C. and that of the treated sludge at the output of the multistage furnace to a temperature ranging between 700.degree. C. and 800.degree. C.

21 Claims, No Drawings

US 7,935,174 B2

TREATMENT OF STEEL PLANT SLUDGES IN A MULTIPLE-STAGE FURNACE

INTRODUCTION

This invention concerns a procedure for the treatment of muds from iron-and-steelworks originating from the dust of blast furnaces, steel works, or rolling mills.

In integrated steelworks, most of the dust from gas treatments originating from blast furnaces or steelworks, or from oxides collected in rolling mills, takes the form of muds containing between 30 and 70% water. Even after passing through a filter press, the resulting muds still contain 20 to 40% water and their treatment by a pyrometallurgical procedure to extract the zinc and recycle the iron contained in it consequently necessitates prior drying.

As these muds constitute the major by-product, it is not possible to agglomerate them into pellets or briquettes by adding "dry" by-products, as this agglomeration requires minimal content in water (less than 10%).

In consequence, the few plants for pyrometallurgical treatment of iron-and-steel works mud that have come into service recently (mostly in Japan) comprise a long series of operations, to whit:
  pre-drying of the mud,
  crushing of the pre-dried mud,
  preparation of a mixture capable of being agglomerated,
    adding a binder and water to the pre-dried mud,
  agglomeration of the mixture (into pellets or briquettes),
  post-drying and/or maturation of the pellets or briquettes,
  the pyrometallurgical procedure proper, which, in the case of the Japanese installations mentioned above, comprises a calcination and reduction stage, with extraction of the major part of the zinc, and
  cooling of the product of the zinc removal and pre-reduction, and
  fusion of the calcinated and reduced briquettes in a blast furnace.

Furthermore, the process of calcinating raw muds in multiple hearth furnaces is known, but
  on the one hand, these muds possess a granulometry and consistency which permit regular transport of the substance by the rabbling device of the furnace,
  on the other hand, the energy input is provided by fuels (gas or oil) which are problematic in both availability and price; the cost of this calcination is therefore very high, especially when the mud under treatment comprises as is often the case in the iron-and-steelworks muds—considerable levels of water and iron oxides, but also carbonates and hydrates, the respective evaporation and reduction of which consume a great deal of energy.

Since iron-and-steelworks muds originate either from dust extraction installations (most often humid), or from the collection of iron oxides formed during the casting and rolling of steel, their initial granulometry is very fine, and preliminary tests show that these muds are not suitable for such calcination treatment in a multiple hearth furnace. Indeed, after the drying phase, these muds disintegrate into a fine dust, which cannot be moved around with shovels, as it behaves like water (in particular, its angle of repose is practically nil).

PURPOSE OF THE INVENTION

The purpose of this invention is therefore to propose a simplified procedure for the treatment of iron-and-steelworks muds, thus avoiding the unwieldy series of operations for conditioning the muds.

According to the invention, this objectives is attained by a procedure according to Claim 1.

GENERAL DESCRIPTION OF THE INVENTION

In order to solve the problem mentioned above, this invention proposes a procedure for the treatment of iron-and-steelworks muds comprising the following stages:
  adjustment of the level of available CaO in the muds in order to obtain a content level of available CaO of 3% to 8% with respect to the weight of the mud,
  addition of a carbonaceous fuel,
  introduction of the mud on to one of the upper floors of a multiple hearth furnace,
  heating of the multiple hearth furnace,
  gradual transfer of the muds on to the lower floors,
  regulation of the temperature of the exhaust gases from the multiple hearth furnace to at least 500° C. and that of the treated muds issuing from the multiple hearth furnace to a temperature within the range 700° C. to 800° C.

The procedure according to the invention not only makes it possible to avoid the unwieldy preparation operations mentioned above, but also to use a multiple hearth furnace into which the muds are loaded directly. In fact, the solution proposed is based on a special utilisation of the multiple hearth furnace and consists in carrying out calcination treatment of the mud by adjusting the composition of the mud and the temperature sequence in order to cause a sort of "granulation" of the mud after drying, in order to render it transportable.

This pseudo-granulation actually takes place spontaneously with the rise in temperature and in the presence of a certain proportion of available CaO lime, which combines with the iron oxides (FeO, $Fe_2O_3$) to form ferrites of lime $2CaO \cdot Fe_2O_3$ or $CaO \cdot FeO \cdot Fe_2O_3$, compounds which may begin to "fritter", that is to say to form pasty, sticky phases, from 700° C. upwards.

However, in spite of apparently sufficient levels of lime in most types of mud, (see table below), this pseudo-granulation does not always occur. It has been discovered that not all lime having a content level determined by classical metering techniques is available for the reaction forming ferrites of lime.

Indeed, precise analysis shows that the lime as metered by classical methods into the mud (visible lime), is present, at least in part, in the form of various calcium salts, for example carbonate $CaCO_3$, sulphate $CaSO_4$, etc. This proportion of the "lime" will therefore not be available to form ferrites of calcium until it has been broken down (for example carbonate into lime and carbon dioxide: $CaCO_3 \rightarrow CaO+CO_2$). Now this reaction is carried out industrially at a temperature in excess of 900° C., and in principle it is very slow at 700° C.

It is apparent that it would be advantageous to increase the temperature to 800° C. or even more, but experience shows that the carbon present then begins to reduce the iron to a considerable degree ($FeO+C \rightarrow Fe+CO$), and that the CO gas released prevents the formation of ferrites of calcium, responsible for that spontaneous granulation of the mud which ensures just the desired suitability for treatment in the multiple hearth furnace.

The available lime or CaO is consequently that fraction of the visible lime that, under the conditions in question, can react with the iron oxides present in the muds to form the ferrites of lime that are responsible for agglomeration. The studies that culminated in the present invention have shown that in practice the fraction of available CaO generally represents no more than 10 to 50% of the visible lime.

CaO content—this is principally slaked lime $Ca(OH)_2$, since there cannot be any quicklime in mud containing 20 to 40% $H_2O$—is expressed, of course, as a percentage by weight of CaO with respect to the dry mud.

This advantageous procedure of drying and calcination with granulation, by which it is possible to treat very fine muds in a multiple hearth furnace, can therefore only function with very precise control of its composition, in this case available lime, and of other parameters, such as temperature, etc.

For the treatment of muds according to the invention, it is therefore important to ensure the presence in the mud to be treated of a minimum proportion of available lime, either by mixing different muds (which is generally impossible or not economically feasible on an industrial scale), or, preferably, by adding lime. In practice, the proportion of available lime is adjusted by adding quicklime and/or slaked lime. As mentioned earlier, for optimum operation of the procedure, the level of available CaO should generally lie between 6% and 15%, preferably between 8% and 12%.

An advantage of the present procedure is that the carbonaceous fuel used to provide the necessary energy for heating the muds can in principle be chosen from among common fossil fuels such as oil, gas and especially coal, or even a combination of these. Apart from the economic advantage of being able to use coal instead of oil or gas, the procedure also enables the carbonaceous fuel to be supplied by adding coal or simply mixing coal with the mud. The addition of coal to the muds can be performed—at least in part—on the upper floor of the multiple hearth furnace. Provision is also made for coal to be mixed with the mud—at least in part—before the latter is introduced into the multiple hearth furnace. For practical reasons, the coal is preferably mixed in before introduction into the multiple health furnace.

It is also envisaged that the addition of carbonaceous fuel may be performed—at least in part—by means of burners installed in the multiple hearth furnace and supplied with a gas or fuel oil.

The coal has to be proportioned principally in accordance with the humidity of the mud. As a general rule (20 to 40% humidity), the order of magnitude of the quantity of coal to be used is at least 100 kg of carbonaceous fuel (coal and/or equivalent in gas and/or fuel oil) per tonne of mud, preferably between 100 and 200 kg per tonne of mud.

An important factor in the treatment procedure according to the invention is the appropriate adjustment of the temperature on the different floors of furnace. In the event, the mud is introduced into the multiple hearth furnace while ensuring a supply of heat on the upper floor such that the gases leave it at a temperature greater than 500° C., preferably greater than 600° C., in order to ensure rapid drying of the mud. It is also important to regulate the lower floors of the furnace to temperatures between 700 and 800° C. (temperature of the refractories), preferably between 700 and 750° C., and the holding time of the mud to a duration sufficient to ensure that the material leaves the furnace at not less than 700° C.

In one form of embodiment, regulation of the temperature of the exhaust gases from the multiple hearth furnace to at least 500° C. and that of the treated mud at the output of the multiple hearth furnace to a temperature in the range 700° C. to 800° C. is effected by injection of a gas containing oxygen, preferably air. As a variant or additionally, regulation of the temperature of the exhaust gases from the multiple hearth furnace to at least 500° C. and/or that of the treated muds issuing from the multiple hearth furnace to a temperature in the range 700° C. to 800° C. is effected by means of burners supplied with gas or fuel oil. In practice, the stepped combustion of the carbonaceous fuel, preferably coal, will generally be ensured by injection of air regulated to attain and maintain the set temperatures on the different floors. Burners supplied with gas or fuel oil can provide any supplementary energy that may be necessary on one floor or another.

In practice, then, the temperature of the exhaust gases is not regulated directly, but indirectly, by addition of coal supplied with the mud, and of air, and if necessary by providing additional gas or fuel oil on the first floors (the upper floors); the additions of coal, gas and air are therefore regulated so as to obtain a flue gas temperature, that is to say a exhaust gas temperature, in excess of 500° C.

Similarly, the temperature of the material leaving the furnace is not regulated directly, but indirectly, by the temperatures on the last floors (regulation of the temperature of these last being effected by the addition of air burning coal), and by holding time. Consequently, if the holding time is long (e.g. 2 hours), the temperature of the material leaving the furnace will be very close to that of the last floor (temperature of the refractory), e.g. 725° C. for a hearth temperature of 750° C., but for a short of holding time (1 hour), the material will be removed at approximately 700° C. for the same temperature of the last floor (750° C.). If operation with short holding times is desired, it is therefore necessary to have higher temperatures on the last floors in order to obtain a given temperature of the material leaving the furnace.

To sum up, the advantages of a treatment procedure according to the invention of muds originating from iron-and-steelworks by drying and calcination in a multiple hearth furnace are as follows:

it ensures that the material is transportable, thus avoiding very unwieldy multi-stage preparation, it minimizes energy needs in the possible later stage of reduction and fusion, by breaking down the carbonates and hydrates, reactions which are highly endothermic, and it further minimizes the energy cost of the drying and calcination operation, by using coal as the principal fuel.

An advantageous form of embodiment of the procedure for the treatment of muds from iron-and-steel works described above also comprises the following stages:

pyrometallurgical treatment comprising the reduction and fusion in an electric furnace of the treated muds from the multiple hearth furnace, extraction of any zinc contained in the treated muds, or the exhaust gases, and pouring of the iron and slag produced by the electric furnace.

These stages, which constitute a final operation of reduction and fusion, with extraction of the zinc from the treated or calcined muds, can advantageously be performed in an electric arc furnace, for example according to a procedure such as that described in international patent application number WO2002068700.

The latter procedure employs a free-arc electric furnace in a highly specific procedure consisting in charging the hot treated muds (preferably immediately they leave the multiple hearth furnace, that is to say at a temperature greater than 500° C.), and in working on a heel of molten iron surmounted by a layer of non-foaming liquid slag. Agitation of the heel can be done by injection of a neutral gas (nitrogen or argon) through the bottom of the furnace and/or by injection of gas containing oxygen by means of one or more lances. The heel is very powerfully agitated by injection of gas. This very energetic agitation makes it possible to homogenize the metal+slag bath and to refresh the surface of the layer of slag so that it remains superheated and quite liquid, and capable of absorbing the treated muds without the latter becoming solid and forming an impenetrable crust.

In cases where the heel is agitated by injection of neutral or inert gas through the bottom of the electric arc furnace, the flow rate of the inert gas in the procedure proposed should preferably be between 50 l/min.t (litres per minute and per tonne of liquid metal in the bath) and 150 l/min.t. It is particularly preferable that the agitation flow rate should be between 80 and 120 l/min.t. These flow rates must be adjusted according to the depth of the heel and the number and position of the injection points. This high rate of agitation bears no relation to common practice in the arc furnace. Indeed, the rate of agitation in classical procedures of steel production in an electric furnace lies within the range 1 to 10 l/min.t and is designed solely to homogenize the bath and regularize metallurgical results and temperature.

To ensure optimum efficiency of agitation, the metal heel must have a certain minimum depth, preferably at least 0.3 m, in order to ensure energetic agitation of the molten metal bath. Care must be taken to avoid a situation where injection of the agitation gas through the bottom of the furnace simply forms a "hole" through the bath of metal without setting it in vigorous motion. Of course, this minimum depth can vary according to the configuration of the arc furnace and the positioning of the means of injection of gas, which should preferably be porous bricks, or alternatively nozzles.

The means of injection of the agitation gas may in some cases be positioned near the outer edge of the bottom of the arc furnace, that is to say laterally at the bottom of the bath, so that those particles of treated mud that remain or tend to coagulate at the edge of the furnace are brought towards the hottest, central zone located between the electrodes.

As an alternative, or in addition to agitation of the metal heel by the injection of inert gas through the bottom of the furnace, agitation of the metal heel is effected by the injection of gas containing oxygen by means of one or more injectors. When gas containing oxygen is injected into the heel by a penetrating jet, bubbles of gaseous CO are formed by reaction with the C in the molten metal. This release of CO in the liquid metal creates eddies which ensure vigorous agitation of the metal heel and the slag.

To protect the treated muds as they fall into the furnace, they can be surrounded by a curtain of inert gas, preferably nitrogen or argon. This curtain of inert gas, which is preferably annular in form, minimizes lateral escape of particles due to the suction of the furnace and the consequent re-oxidation of the treated muds before they have time to reach the layer of slag, or metal heel, as the case may be. Preferably, a nitrogen flow rate of the order of 50 $Nm^3/h$ to 200 $Nm^3/h$ will be used to form the protective curtain and thus protect the transfer of approximately 10 to 60 t/h of treated muds comprising approximately 50% Fe, metallized to a proportion between 60 and 100%. These values depend on many factors, such as the geometry of the furnace, the height of fall of the treated mud, the turbulence inside the arc furnace, etc., and must be adapted in consequence.

The treated mud is generally transferred to the central region of the arc furnace, located between the electrodes.

It is possible to mix coal, preferably having a grain size between 2 and 20 mm, with the treated muds before their transfer into the arc furnace. The quantity of coal employed will depend on the amount of carbon contained in the treated mud.

The need for excess carbon in the material leaving the multiple hearth furnace depends on the iron content, the degree of metallization and the proportion of residual carbonates. Experience shows that between 12 and 18% of excess C is required if cast iron with 3.5 to 5% C is produced. Sulphur content depends on the initial sulphur content of the mud. The aim will be a sulphur level in the cast iron between 0.04 and 0.08% for a content level of 0.4 to 0.6% S in the initial mud.

The zinc contained in the treated mud can be recovered almost in its entirety by extraction from the exhaust gases.

In conclusion, apart from the advantages presented above, these additional stages in an advantageous mode of execution of the procedure for treatment of mud from iron-and-steel works according to the invention enable:

the use of such muds in a pyrometallurgical procedure, and almost complete extraction of the zinc.

EXAMPLES

The table below shows the typical elementary compositions of these muds (or dusts in the case of dry dust extraction).

| Origin | 1<br>Dry dust extraction<br>Dry (aggregate + blast furnace + steelworks) | 2<br>Humid dust extraction<br>Blast-furnace mud | 3<br>Humid dust extraction<br>Steel-works mud | 4<br>Water purification Rolling-mill mud |
|---|---|---|---|---|
| Fe | 30 | 12 | 55 | 62 |
| C | 26 | 40 | 3 | 5 |
| Visible CaO | 5 | 18 | 10 | 2 |
| $SiO_2$ | 5 | 6 | 1 | 1 |
| $Al_2O_3$ | 2 | 4 | 0 | 0 |
| MgO | 1 | 2 | 1 | 2 |
| Zn | 0~1 | 1~5 | 0.5~5 | 0~1 |
| Pb | 0~1 | 0~1 | 0~0.5 | 0~0.1 |

The major problem when implementing a procedure for the treatment of iron-and-steelworks mud in a multiple hearth furnace is a consequence of the very fine grain size of the dusts contained in such muds, which leads to excessive fluidity when the mud has been dried.

We have discovered that in principle it is nevertheless possible to treat such muds in a multiple hearth furnace in controlled conditions, if enough CaO lime is present to enable the formation of ferrites of lime, which favour the agglomeration of the dusts.

Data obtained according to standard methods of metering show a content level of CaO apparently sufficient for a good proportion of the iron-and-steelworks dusts and muds recovered from integrated steelworks. However, during the research that culminated in the present Invention, it became clear that in certain cases, the formation of ferrites of lime, that is to say the agglomeration of the dust, did not occur, even in cases where there was an apparent sufficiency of lime.

As indicated above, it was only when conducting more precise studies that it was discovered that in reality, due to the standard metering methods employed, the CaO as metered is in general only present in that form in 10 to 50% of the quantity of visible lime determined, the remainder being in the form of other calcium compounds, such as carbonates, sulphates, etc.

Although it is possible to calcine these compounds at high temperature (900° C.), such a temperature cannot be used, for the reasons explained above. The available lime or CaO is thus that fraction of the visible lime which, in the conditions set, can react with the iron oxides present in the mud to form the ferrites of lime responsible for agglomeration.

With the tests that we then carried out, adjusting the CaO content, we were able to obtain good results for muds and mixtures of muds of different origins in which the available CaO content had been adjusted to a value greater than 3%. Values in excess of 8% generally bring no significant advantage, but add considerably to the costs of the procedure.

The invention claimed is:

1. Procedure for the treatment of a material comprising sludge or muds from iron-and-steelworks comprising the following stages:
    receiving the material comprising sludge or muds, at a moisture range of 20 to 40% water;
    adjustment of the available CaO content in the material in order to obtain a level of available CaO of 3% to 8% with respect to the weight of the material;
    addition of a carbonaceous fuel by proportioning the carbonaceous fuel in accordance with a humidity of the material;
    introduction of the material on to one of the upper floors of a multiple hearth furnace;
    heating of the multiple hearth furnace;
    gradual transfer of the material to the lower floors;
    regulation of the temperature of the exhaust gas from the multiple hearth furnace to at least 500° C. and preferential formation of ferrites by combining the CaO with iron minimizing reduction of iron by regulating the temperature and holding time of treated material for a duration to ensure that the treated material is output from the furnace at a temperature within the range of 700° C. to 800° C., thereby causing the CaO to react with the iron oxides present in the material to form the ferrites of lime which favor agglomeration to achieve sufficient spontaneous granulation or pseudo-granulation of the material to render it transportable; and
    discharging the treated material as ferrites of iron exhibiting the granulation or pseudo-granulation.

2. Treatment procedure according to claim 1, wherein the adjustment of the available CaO content is achieved by adding quicklime and/or slaked lime.

3. Treatment procedure according to claim 1, wherein the addition of carbonaceous fuel is effected by adding coal to the sludge material.

4. Treatment procedure according to claim 3, wherein the addition of coal to the material is effected —at least in part— on the upper floor of the multiple hearth furnace.

5. Treatment procedure according to claim 3, wherein the coal is—at least in part—mixed with the material before their introduction into the multiple hearth furnace.

6. Treatment procedure according to claim 3, wherein at least 100 kg of carbonaceous fuel is added per tonne (metric) of material.

7. Treatment procedure according to claim 1, wherein the addition of carbonaceous fuel is effected—at least in part— by means of burners installed in the multiple hearth furnace and supplied with gas or fuel oil.

8. Treatment procedure according to claim 1, wherein regulation of the temperature of the exhaust gases from the multiple hearth furnace to at least 500° C. and/or that of the treated material at the output from the multiple hearth furnace to a temperature within the range 700° C. to 800° C. is effected by injection of a gas containing oxygen.

9. Treatment procedure according to claim 1, wherein regulation of the temperature of the exhaust gases from the multiple hearth furnace to at least 500° C. and/or that of the treated material at the output from the multiple hearth furnace to a temperature within the range 700° C. to 800° C. is effected by burners supplied with gas or fuel oil.

10. Treatment procedure according to claim 1, additionally comprising the following stages:
    pyrometallurgical treatment comprising the reduction and fusion of the treated material in an electric furnace after they leave the multiple hearth furnace;
    extraction of any zinc that may be contained in the treated material and/or the exhaust gases; and
    pouring of the cast iron and slag produced by the electric furnace.

11. Treatment procedure according to claim 10, wherein the electric furnace is an arc furnace.

12. Treatment procedure according to claim 10, wherein the material has a water content of between 30 and 70% water.

13. Treatment procedure according to claim 10, further comprising adjusting composition of the material and providing an adjustment of a temperature sequence in order to cause a predetermined granulation of the of the material after drying, in order to render the material transportable.

14. Treatment procedure according to claim 10, further comprising:
    obtaining the material, wherein the material has a water content of between 30 and 70% water; and
    extracting water from the material to provide the material at a moisture range of 20 to 40% water.

15. Treatment procedure according to claim 1, further comprising:
    carrying out calcination treatment of the material by adjusting the composition of the material and the temperature sequence in order to provide a granulometry and consistency which permit regular transport of the material after drying, in order to render it transportable.

16. Treatment procedure according to claim 15, further comprising:
    carrying out calcination treatment of the material by adjusting the composition of the material and the temperature sequence in order to provide a granulometry and consistency which permit regular transport of the material by formation of ferrites of calcium, the ferrites of calcium resulting in spontaneous granulation of the material to render the slurry transportable during treatment in the multiple hearth furnace.

17. Treatment procedure according to claim 16, further comprising:
    formation of ferrites of calcium, responsible for the spontaneous granulation of the material to ensure suitability for treatment in the multiple hearth furnace for material loaded directly into the multiple hearth furnace.

18. Treatment procedure according to claim 1, further comprising:
    carrying out calcination treatment of the material by adjusting the composition of the material and the temperature sequence in order to provide a granulometry and consistency which permit regular transport of the material by a rabbling device of the furnace of the material after drying, in order to render it transportable.

19. Treatment procedure according to claim 1, further comprising:
    said combining the available CaO with iron oxides to form ferrites of lime comprises forming $2CaO.Fe_2O_3$ or $CaO.FeO.Fe_2O_3$ compounds.

20. Treatment procedure according to claim 1, further comprising:
    minimizing reduction of iron by regulating the temperature of the treated material at the output by regulating the lower floors of the furnace to temperatures between 700° C. and 750° C.

21. Treatment procedure according to claim 1, additionally comprising the following stages:

pyrometallurgical treatment comprising the reduction and fusion of the treated material in an electric furnace after it leaves the multiple hearth furnace, incorporating at least a portion of the carbonaceous fuel added to the material in the multiple hearth furnace; and extraction of any zinc that may be contained in the treated material and/or the exhaust gases.

* * * * *

UNITED STATES PATENT AND TRADEMARK OFFICE
CERTIFICATE OF CORRECTION

| | | |
|---|---|---|
| PATENT NO. | : 7,935,174 B2 | Page 1 of 1 |
| APPLICATION NO. | : 11/664505 | |
| DATED | : May 3, 2011 | |
| INVENTOR(S) | : Jean-Luc Roth et al. | |

It is certified that error appears in the above-identified patent and that said Letters Patent is hereby corrected as shown below:

Column 7, Claim 1, Lines 25-26
Please delete "CaO with iron minimizing reduction"
and replace with -- CaO with iron and minimizing reduction --

Column 7, Claim 3, Line 42
Please delete "sludge material."
and replace with -- material. --

Signed and Sealed this
Fourteenth Day of June, 2011

David J. Kappos
*Director of the United States Patent and Trademark Office*